(12) United States Patent
Fischer

(10) Patent No.: US 6,616,184 B2
(45) Date of Patent: Sep. 9, 2003

(54) VEHICLE OCCUPANT PROTECTION APPARATUS WITH INFLATION VOLUME AND SHAPE CONTROL

(75) Inventor: Kurt F. Fischer, Oxford, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/842,353

(22) Filed: Apr. 25, 2001

(65) Prior Publication Data
US 2002/0158456 A1 Oct. 31, 2002

(51) Int. Cl.⁷ .............................................. B60R 21/32
(52) U.S. Cl. ................................. 280/743.2; 280/735
(58) Field of Search .................... 280/743.1, 743.2, 280/734, 735, 739, 728.1

(56) References Cited

U.S. PATENT DOCUMENTS

| | | | | |
|---|---|---|---|---|
| 5,489,119 A | * | 2/1996 | Prescaro et al. | 280/730.1 |
| 5,607,183 A | * | 3/1997 | Parker | 280/743.1 |
| 5,678,858 A | * | 10/1997 | Nakayama et al. | 280/728.2 |
| 5,762,367 A | * | 6/1998 | Wolanin | 280/736 |
| 5,813,696 A | * | 9/1998 | Hill | 280/43.2 |
| 5,887,894 A | * | 3/1999 | Castagner et al. | 280/735 |
| 6,076,854 A | | 6/2000 | Schenck et al. | |
| 6,086,092 A | * | 7/2000 | Hill | 280/729 |
| 6,189,928 B1 | * | 2/2001 | Sommer et al. | 280/731 |
| 6,254,130 B1 | * | 7/2001 | Jayaraman et al. | 280/731 |
| 6,315,323 B1 | * | 11/2001 | Pack, Jr. | 280/735 |
| 6,325,415 B1 | * | 12/2001 | Zelinski et al. | 280/728.1 |
| 6,334,627 B1 | * | 1/2002 | Heym et al. | 280/728.1 |
| 6,345,841 B2 | * | 2/2002 | Igawa et al. | 280/729 |
| 6,390,501 B1 | * | 5/2002 | Greib et al. | 280/739 |
| 6,422,597 B1 | * | 7/2002 | Pinsenschaum et al. | 280/735 |
| 6,425,603 B1 | * | 7/2002 | Eschbach | 280/743.2 |
| 6,454,300 B1 | * | 9/2002 | Dunkle et al. | 280/742 |

FOREIGN PATENT DOCUMENTS

| | | | | |
|---|---|---|---|---|
| EP | 586131 | * | 7/1996 | |
| JP | 5-33427 | * | 8/1993 | |
| JP | 405201301 A | * | 8/1993 | 280/743.2 |
| JP | 06286543 | * | 10/1994 | |

OTHER PUBLICATIONS

Co–pending U.S. patent application Ser. No. 09/469.053, filed Dec. 21, 1999 entitled "Apparatus for Positioning an Inflated Air Bag". US Pat 6315323.

* cited by examiner

Primary Examiner—Paul N. Dickson
Assistant Examiner—Deanne Draper
(74) Attorney, Agent, or Firm—Tarolli, Sundheim, Covell & Tummino L.L.P.

(57) ABSTRACT

A vehicle occupant protection apparatus (10) comprises an inflatable device (14) for helping to protect an occupant of a vehicle during a crash condition. A support structure (18) secures a portion of the inflatable device (14). A plurality of tethers (34, 36, 38, and 40) extend between the support structure (18) and the inflatable device (14). At least one sensor (62, 64, 66, or 68) senses a vehicle occupant condition and generates an occupant condition signal indicative of the sensed condition. A control module (72) receives the occupant condition signal and determines a preferred inflation volume and shape for the inflatable device (14). The control module (72) determines which of the respective tethers (34, 36, 38, and 40) to release for inflating the inflatable device (14) to the preferred inflation volume and shape and initiates the release of the respective tethers (34, 36, 38, and 40) from the support structure (18).

11 Claims, 5 Drawing Sheets

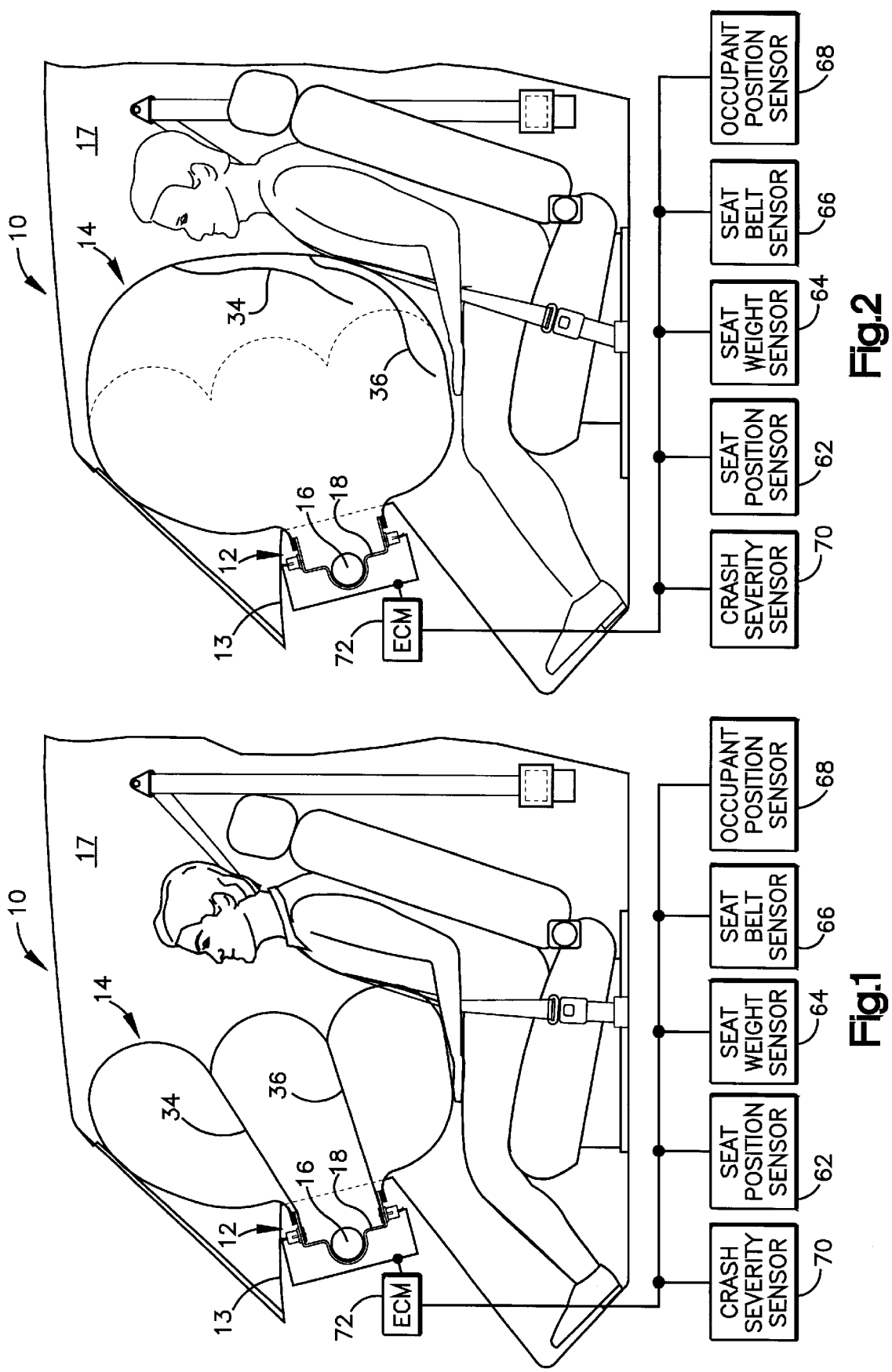

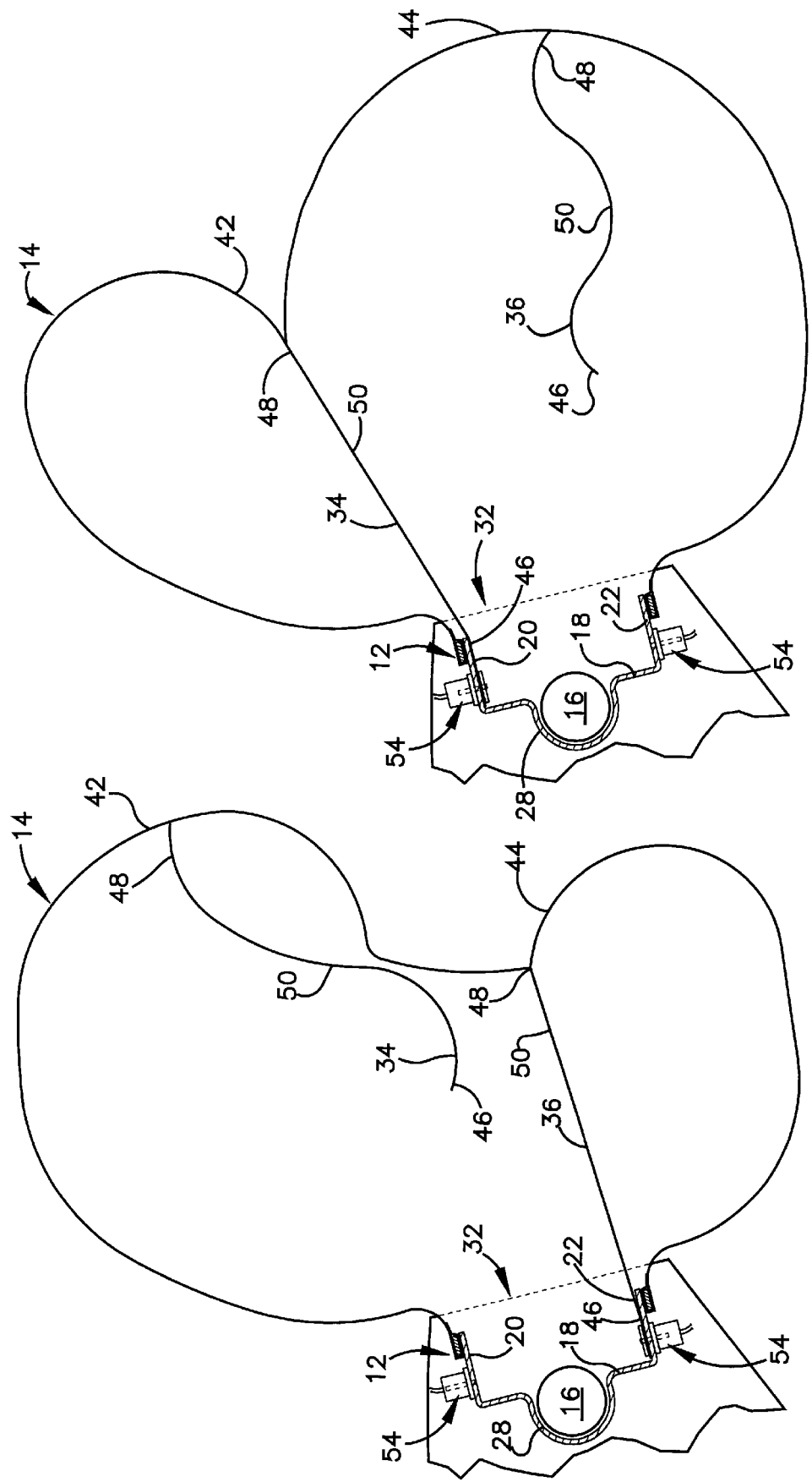

VEHICLE OCCUPANT PROTECTION APPARATUS WITH INFLATION VOLUME AND SHAPE CONTROL

TECHNICAL FIELD

The present invention relates to a vehicle occupant protection apparatus and, more particularly, to a vehicle occupant protection apparatus having an inflatable device.

BACKGROUND OF THE INVENTION

A known vehicle occupant protection apparatus includes an inflatable device known as an air bag. An air bag may be inflated during a vehicle crash condition to help protect a vehicle occupant.

It is desirable to control the inflation volume and shape of an air bag. By controlling the inflation volume and shape, the inflated air bag may be customized for varying conditions, including the size, weight, and Position of the occupant.

U.S. Pat. No. 6,076,854 addresses varying conditions of the occupant by providing an air bag assembly in which the inflation volume of the air bag assembly in which the inflation volume of the air bag may be modified from a partially inflated volume to a fully inflated volume. The air bag assembly includes a plurality of tethers that are connected to the air bag. Depending upon the varying conditions, during inflation of the air bag, all of the tethers remain secured so that the air bag is partially inflated or all of the tethers are released so that the air bag is fully inflated.

Co-pending application Ser. No. 09/469,053, filed Dec. 21, 1999, which is assigned to the assignee of the present application, also addresses varying conditions of the occupant. In the copending application, the air bag assembly preferably includes four tethers, each of which is attached between the air bag and a tether tension control mechanism. Based on the varying conditions, the tether tension control mechanism may shorten the lengths of the tethers to change the volume and location of the inflated air bag. Shortening some tethers and not shortening others may move the air bag to a desired location with respect to the occupant.

SUMMARY OF THE INVENTION

The present invention is a vehicle occupant protection apparatus. The vehicle occupant protection apparatus comprises an inflatable device, a support structure, a plurality of tethers, at least one sensor, and a control module. The inflatable device helps to protect an occupant of a vehicle during a crash condition. The support structure secures a portion of the inflatable device. The plurality of tethers extend between the support structure and the inflatable device. The sensor senses a vehicle occupant condition and generates an occupant condition signal indicative of the sensed condition. The control module receives the occupant condition signal and determines a preferred inflation volume and shape of the inflatable device. The control module determines which of the respective tethers to release for inflating the inflatable device to the preferred inflation volume and shape and initiates the release of the respective tethers from the support structure.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic representation of a vehicle occupant protection apparatus constructed in accordance with the present invention wherein an air bag is inflated to a minimum inflation volume;

FIG. 2 is a schematic representation of the vehicle occupant protection apparatus of FIG. 1 wherein an air bag is inflated to a maximum inflation volume;

FIG. 3 is an illustration of an inflated air bag of the present invention wherein the air bag is shaped such that an upper portion of the air bag extends farther outward than a lower portion of the air bag;

FIG. 4 is an illustration of an inflated air bag of the present invention wherein the air bag is shaped such that a lower portion of the air bag extends farther outward than an upper portion of the air bag;

DESCRIPTION OF THE PREFERRED EMBODIMENT

Figure 6:
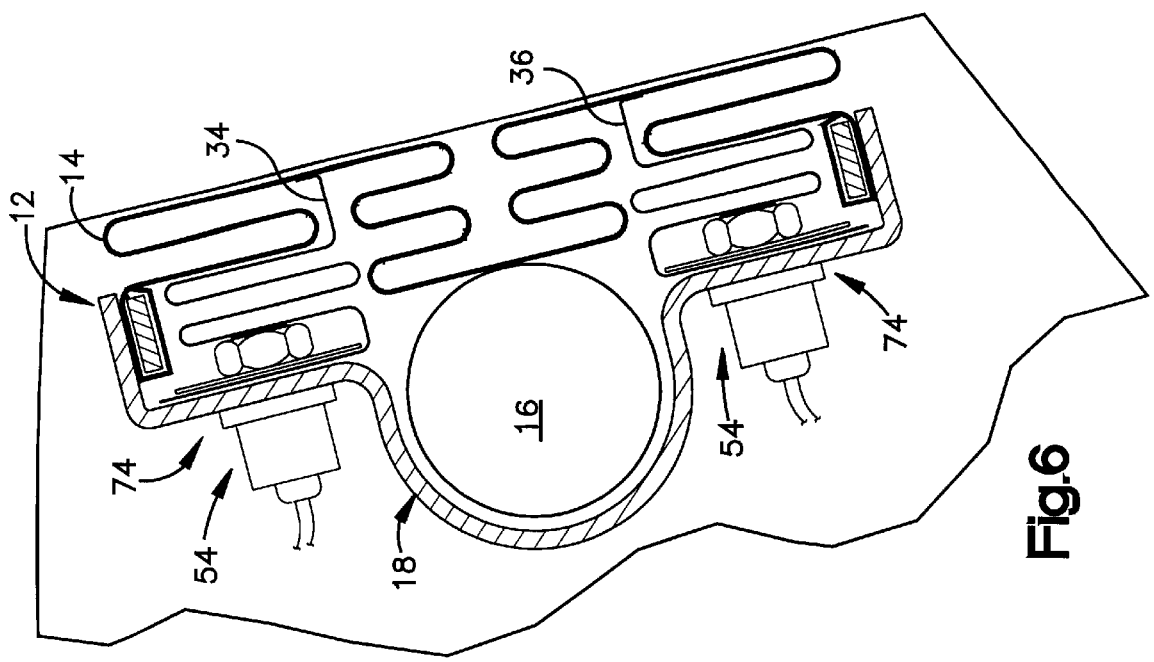
FIG. 6 illustrates an air bag module of the vehicle occupant protection apparatus including a second embodiment of a release mechanism.

The vehicle occupant protection apparatus 10 illustrated in FIGS. 1 and 2 includes an air bag module 12 mounted in either the instrument panel 13 or the steering wheel (not shown) of a vehicle. The air bag module 12 includes an air bag 14, an inflator 16 for inflating the air bag 14, and a reaction can 18 for housing the inflator 16 and the uninflated air bag 14.

Figure 5:
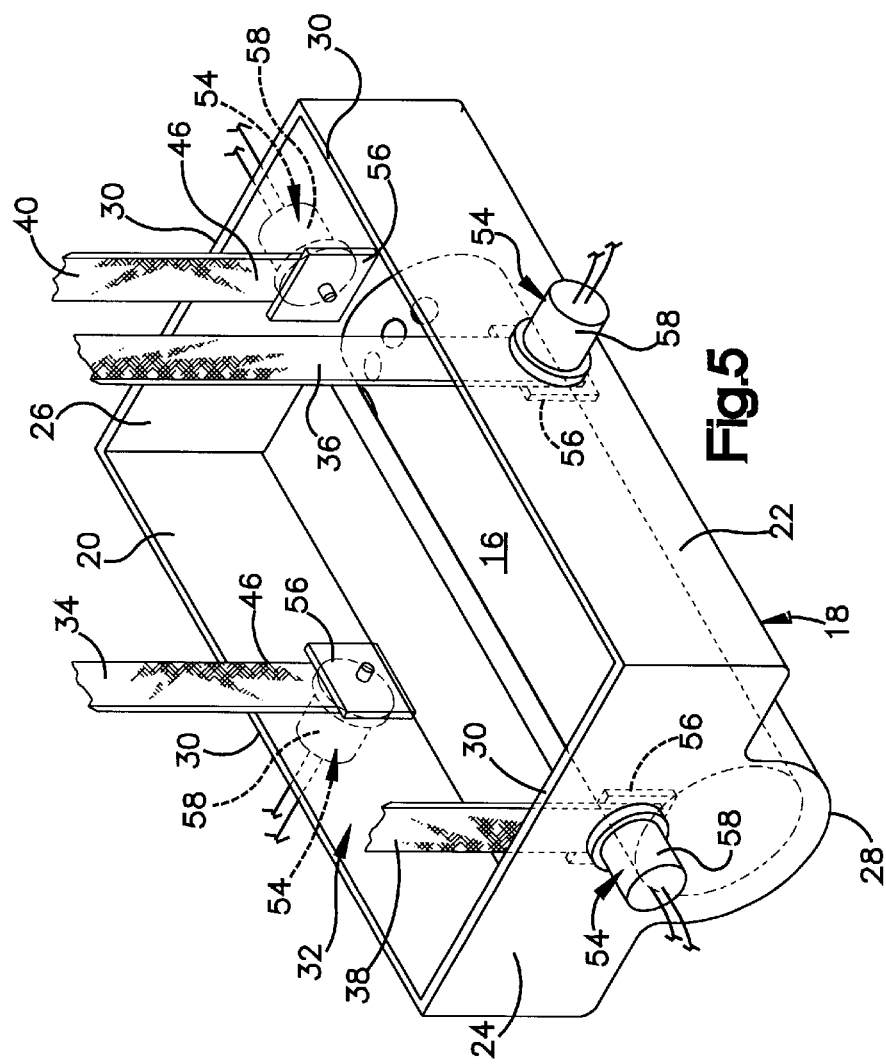
FIG. 5 is a perspective view of a portion of the vehicle occupant protection apparatus of the present invention including a reaction can of an air bag module with release mechanisms securing tethers to the reaction can.

With reference to FIG. 5, the reaction can 18 is preferably made from metal. The reaction can 18 includes upper and lower side walls 20 and 22, respectively. The upper and lower side walls 20 and 22 are interconnected by opposite left and right side walls 24 and 26, respectively, and a curved front wall 28.

Each of the upper, lower, left, and right side walls 20, 22, 24, and 26 has a rear edge surface 30 opposite the front wall 28. The four rear edge surfaces 30, collectively, define an opening 32 into the reaction can 18. When the air bag module 12 is mounted to the instrument panel 13 of the vehicle, the opening 32 of the reaction can 18 is nearest the vehicle occupant compartment 17 (FIG. 1).

As shown in FIG. 5, four tethers 34, 36, 38, and 40 extend from the reaction can 18. Preferably, one tether extends from each side wall 20, 22, 24, and 26 of the reaction can 18. Thus, an upper tether 34 extends from the upper side wall 20 of the reaction can 18. A lower tether 36 extends from the lower side wall 22 of the reaction can 18. A left tether 38 extends from the left side wall 24 of the reaction can 18. A right tether 40 extends from the right side wall 26 of the reaction can 18.

The tethers 34, 36, 38, and 40 initially extend between the reaction can 18 and the air bag 14, as shown in FIG. 1. The tethers 34, 36, 38, and 40 are attached to the air bag 14 such that when the air bag 14 is inflated, the length of the tethers 34, 36, 38, and 40 limits the inflation volume of the air bag 14 and shapes the air bag 14. Preferably, the upper tether 34 is attached to an upper portion 42 (FIGS. 3 and 4) of the air bag 14. The lower tether 36 is attached to a lower portion 44 of the air bag 14. The left tether 38 is attached to a left portion (not shown) of the air bag 14, and the right tether 40 is attached to a right portion (not shown) of the air bag 14.

Figure 9:
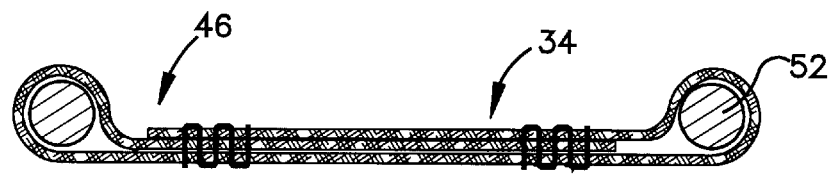
FIG. 9 illustrates a cross-section of a first end of a tether of the vehicle occupant protection apparatus of the present invention.

As shown in FIGS. 3 and 4 with specific reference to tethers 34 and 36, each tether 34, 36, 38, and 40 includes a first end 46, a second end 48, and an intermediate portion 50 that extends between the first and second ends 46 and 48. The first end 46 of each tether 34, 36, 38, or 40 is secured to the reaction can 18 prior to inflation of the air bag 14. FIG. 9 shows a cross-sectional view of the first end 46 of a tether, for example, tether 34. Preferably, the tether 34 is woven from a fabric material, such as nylon. The tether 34 is made from a single piece of material that is folded upon itself along its length to form three layers that are sewn together. The first end 46 of the tether 34 also includes a welt 52. The welt 52 is a 1/16 to 1/8 inch plastic or metal cord that surrounds the portion of the first end 46 of the tether 34 that is secured to the reaction can 18. The welt 52 strengthens the first end 46 of the tether 34 and prevents ripping of the tether 34 when the tether 34 is subjected to a tension. The second end 48 of each tether 34, 36, 38, and 40 is attached to the air bag 14 by stitches, adhesive, or the like.

As best shown in FIG. 5, the first end 46 of each tether 34, 36, 38, and 40 is secured to the reaction can 18 by a release mechanism 54. Each release mechanism 54 illustrated in FIG. 5 includes an anchoring plate 56 that is connected to a solenoid mechanism 58. The anchoring plate 56 includes a surface that is contoured to mate with an inner surface of the respective side wall 20, 22, 24, or 26 upon which the release mechanism 54 is mounted. Preferably, the surface of the anchoring plate includes a grip (not shown) for holding the first end 46 of the respective tether 34, 36, 38, or 40 against the inner surface of the respective side wall 20, 22, 24, or 26.

The solenoid mechanism 58 includes an arm (not shown) that extends through the respective side wall 20, 22, 24, or 26 and attaches to the anchoring plate 56. In an unactuated position, the solenoid mechanism 58 presses the anchoring plate 56 against the inner surface of the respective side wall 20, 22, 24, or 26 of the reaction can 18. The first end 46 of the respective tether 34, 36, 38, or 40 is clamped between the anchoring plate 56 and the reaction can 18. In the clamped position, the welt 52 of the first end 46 of the tether 34, 36, 38, or 40 surrounds the grip of the anchoring plate 56. Thus, in addition to preventing ripping of the respective tether 34, 36, 38, or 40, the welt 52 helps to prevent the tether 34, 36, 38, or 40 from sliding out from under the anchoring plate 56, particularly when subjected to a tension. The first end 46 of the tether 34, 36, 38, or 40 may be slotted for fitting around the arm of the solenoid mechanism 58 or the anchoring plate 56 may extend to the side of the arm of the solenoid mechanism 58 when clamping the respective tether 34, 36, 38, or 40.

As shown in FIGS. 1 and 2, the vehicle occupant protection apparatus 10 also includes at least one sensor for sensing a vehicle occupant condition and for generating an occupant condition signal indicative of the sensed condition. Preferably, the vehicle occupant safety apparatus 10 includes four sensors for sensing vehicle occupant conditions. The four sensors include a seat position sensor 62, a seat weight sensor 64, a seat belt usage sensor 66, and an occupant position sensor 68. Each of the four sensors 62, 64, 66, and 68 is of a known construction.

Additionally, the vehicle occupant protection apparatus 10 includes a crash severity sensor 70 for sensing the occurrence and the severity of a vehicle crash condition. The crash severity sensor 70 generates a signal indicative of the crash condition.

Each of the sensors 62, 64, 66, 68, and 70 is electrically connected to an electronic control module 72. The electronic control module 72 preferably includes a microprocessor. The electronic control module 72 receives power from a power source (not shown), preferably the vehicle battery. The electronic control module 72 is also electrically connected to both the inflator 16 of the air bag module 12 and to the solenoid mechanism 58 of each release mechanism 54. The electronic control module 72 may include circuitry that would prevent the energization of each solenoid mechanism 58 except upon actuation of the air bag module 12.

Upon the occurrence of a crash condition, the electronic control module 72 receives the signal generated by the crash severity sensor 70 and determines whether or not the air bag module 12 should be actuated. If the air bag module 12 is actuated, the electronic control module 72 uses the occupant condition signals received from the occupant condition sensors 62, 64, 66, and 68 to determine a preferred inflation volume and shape for the air bag 14. The inflation volume of the inflated air bag 14 ranges from a minimum volume when each tether 34, 36, 38, and 40 remains attached to the reaction can 18, as shown in FIG. 1, to a maximum volume when each tether 34, 36, 38, and 40 is released from the reaction can 18, as shown in FIG. 2. The number of stages between the minimum volume and the maximum volume is dependent upon the number of tethers and the tether arrangement, as will become clearer after reference to the remainder of this description.

Two examples of the electronic control module 72 using occupant condition signals to determine the preferred inflation volume and shape for the air bag 14 follow. For simplicity of the description, the examples focus on the upper and lower portions 42 and 44 of the air bag 14. Those skilled in the art will recognize that similar shaping of the left and right portions of the air bag 14 is within the scope of this invention.

In the first example, the occupant is determined to weigh 80 pounds, the seat is in the forwardmost seat position, and the occupant is leaning against the seat back with the seat back reclined slightly. Based on the signals from sensors 62, 64, and 68, the electronic control module 72 may determine that the preferred inflation of the air bag 14 is low volume with the upper portion 42 of the air bag 14 extending farther outward than the remainder of the air bag 14. Thus, upon actuation of the air bag 14, the electronic control module 72 will actuate only the solenoid mechanism 58 on the upper side wall 20. As a result, during inflation of the air bag 14, the upper tether 34 will be released and the lower, left, and right tethers 36, 38, and 40 will remain secured to the reaction can 18 and will limit the inflation volume of the air bag 14. Thus, the air bag 14 will take an inflated shape similar to that shown in FIG. 3.

In the second example, the occupant is determined to weigh 200 pounds, the seat is in the rearmost seat position, and the occupant is leaning forward in the seat. Based on signals from sensors 62, 64, and 68, the electronic control module 72 may determine that a preferred inflation of the air bag 14 is a high volume with the upper portion 42 of the air bag 14 less inflated than the remainder of the air bag 14. Upon actuation of the air bag 14, the electronic control module 72 will energize the solenoid mechanisms 58 on the lower, left, and right side walls 36, 38, and 40, but will not energize the solenoid mechanism 58 on the upper side wall 20. As a result, during inflation of the air bag 14, the lower, left, and right tethers 36, 38, and 40 will be released and the upper tether 34 will remain secured to the reaction can 18. As a result, the air bag 14 will inflate to a high inflation volume and the air bag 14 will have an inflated shape similar to that shown in FIG. 4.

Figure 7:
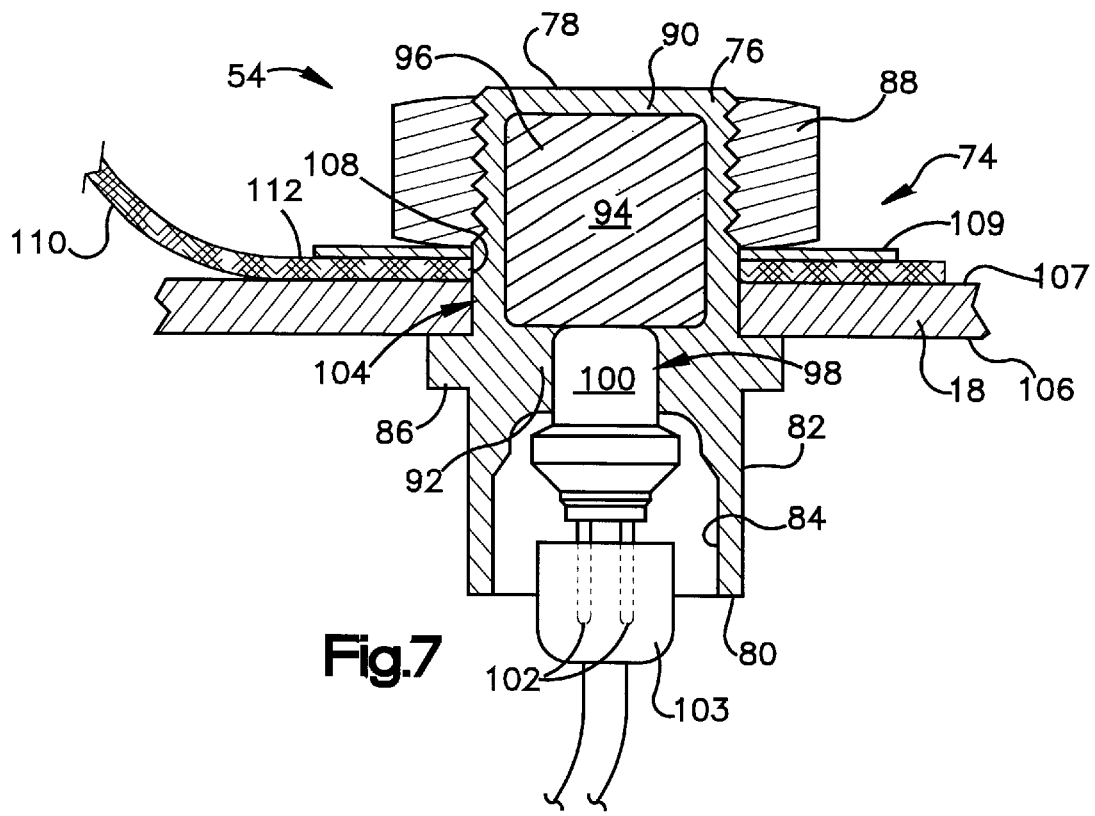
FIG. 7 illustrates an enlarged view of the release mechanism of FIG. 6.

FIG. 6 illustrates a second embodiment of the release mechanisms 54 of the vehicle occupant protection apparatus 10 of the present invention. The release mechanisms 54 illustrated in FIG. 6 are exploding fasteners 74. FIG. 7 illustrates an enlarged view of an exploding fastener 74. The exploding fastener 74 includes an axially extending tubular bolt 76. The bolt 76 has a length defined as the distance between a first axial end 78 and a second axial end 80. The bolt 76 has an outer surface 82 and an inner surface 84. A radially outwardly extending flange 86 extends from the outer surface 82 of the bolt 76 at approximately the middle of the length of the bolt 76. The outer surface 82 of the bolt 76 is threaded from a first axial end 78 to the outwardly extending flange 86 for receiving a nut 88.

An end wall 90 closes the first axial end 78 of the bolt 76. A central wall 92 extends inwardly from the inner surface 84 of the bolt 76 at about the middle of the length of the bolt 76 to define a chamber 94 in the first axial end 78 of the bolt 76. A pyrotechnic charge 96 is located in the chamber 94. The central wall 92 includes a bore 98 for receiving an initiator 100. The initiator 100 is electrically connected to the electronic control module 72 by a connector 103 that attaches to terminals 102 of the initiator 100. Although a bolt-nut combination has been described, those skilled in the art will recognize that an exploding rivet or other fastener may be used.

When using the exploding fastener 74 in the vehicle occupant protection apparatus 10, the reaction can 18 includes a bore 104 for receiving the exploding fastener 74. The bore 104 is sized so that the threaded outer surface 82 of the bolt 76 will extend through the bore 104 but the radially outwardly extending flange 86 will not extend through the bore 104.

The first axial end 78 of the bolt 76 is received in the bore 104 in the reaction can 18, and the bolt 76 is moved into the bore 104 until the radially outwardly extending flange 86 of the bolt 76 presses against an outer surface 106 of the reaction can 18. Preferably, the radially outwardly extending flange 86 is welded to the outer surface 106 of the reaction can 18. When the radially outwardly extending flange 86 is pressed against the outer surface 106 of the reaction can 18, the first axial end 78 of the bolt 76 extends into the reaction can 18 beyond an inner surface 107 of the reaction can 18.

The tether 110 of the vehicle occupant protection apparatus 10 also includes a hole 108. The hole 108 in the tether 110 extends through the first end 112 of the tether 110. Preferably, a welt 52 (FIG. 9) surrounds the hole 108 in the tether 110.

The first axial end 78 of the bolt 76 extends through the hole 108 of the tether 110 such that the threaded outer surface 82 of the bolt 76 extends through the hole 108 in the tether 110. Preferably, a washer 109 is placed on the bolt 76 and then the nut 88 is screwed onto the bolt 76. By tightening nut 88, the nut 88 and the washer 109 clamp the tether 110 to the reaction can 18.

The exploding fastener 74 is of sufficient strength to retain the tether 110 during inflation of the air bag 14. If the electronic control module 72 determines that the tether 110 should be released, the electronic control module 72 will send a signal to the initiator 100 causing the initiator 100 to ignite the pyrotechnic charge 96 in the chamber 94 of the respective bolt 76. The pyrotechnic charge 96 will sever the bolt 76 in a location between the nut 88 and the radially outwardly extending flange 86. As a result, the tether 110 will be released. Those skilled in the art will recognize that a cage, a retaining wire, or other means may be used to prevent the nut 88 and the washer 109 from projecting into the inflating air bag 14.

Figure 8:
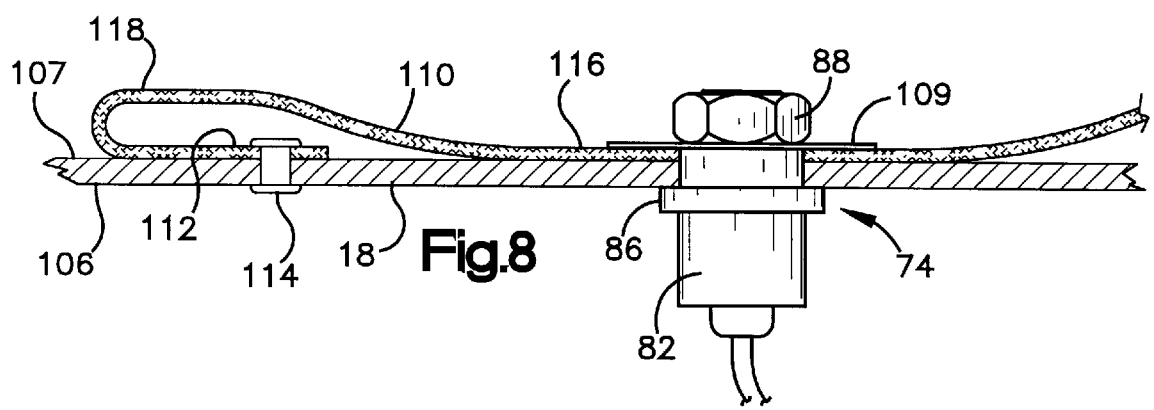
FIG. 8 illustrates an alternate tether arrangement for the vehicle occupant protection apparatus of the present invention using the release mechanism of FIG. 6.

The use of the exploding fastener 74 allows an alternate tether arrangement for the vehicle occupant protection apparatus 10 of the present invention. As shown in FIG. 8, the first end 112 of a tether 110 is secured to the reaction can 18 by a first fastener 114. The intermediate portion 116 of tether 110 is secured to the reaction can 18 by an exploding fastener 74. A loose portion 118 of tether 110 extends between the first fastener 114 and the exploding fastener 74. If the exploding fastener 74 is actuated, the loose portion 118 of tether 110 is released from the reaction can 18. As the air bag 14 inflates, tether 110 becomes taut and limits further inflation of the respective portion of the air bag 14. To further affect inflation volume and shape of the air bag 14, the first fastener 114 may also be a release mechanism 54 that can be separately actuated. Thus, release mechanisms 54 may be systematically actuated to control an amount of the tether 110 that is released. This tether arrangement increases the number of stages of inflation volume between the minimum volume and the maximum volume. Those skilled in the art will recognize that additional exploding fasteners 74 and loose portions of the tether 110 may be included to further increase the number of stages.

Figure 10:
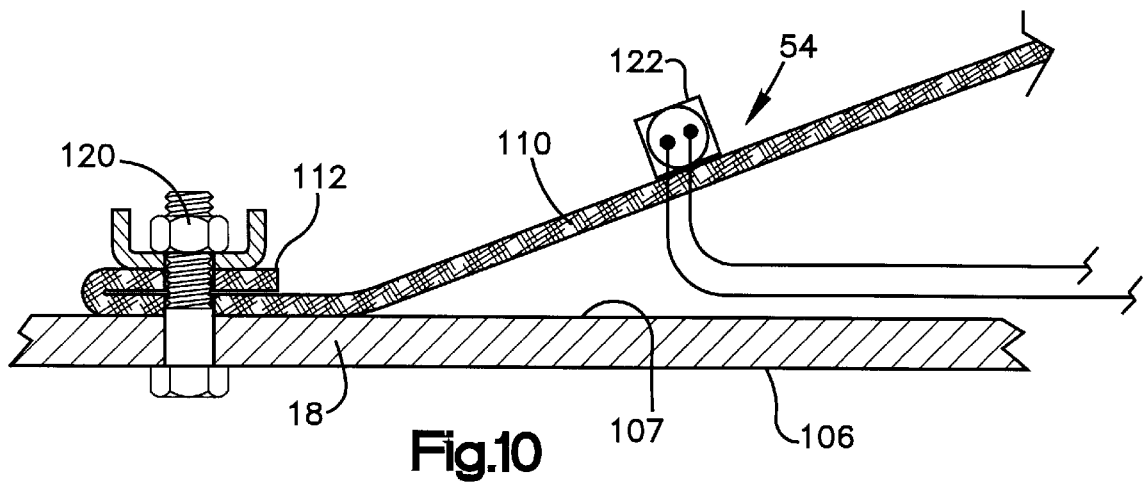
FIG. 10 illustrates a third embodiment of the release mechanism of the vehicle occupant protection apparatus of the present invention.

A third embodiment of the release mechanism 54 of the vehicle occupant protection apparatus 10 is illustrated in FIG. 10. The first end 112 of the tether 110 is permanently secured to the reaction can 18 by a fastener 120. Near the first end 112 of the tether 110, a pyrotechnic charge 122 is placed on or is woven into the fabric of the tether 110. The pyrotechnic charge 122 is electrically connected to the electronic control module 72. Upon actuation, the pyrotechnic charge 122 burns through the tether 110 to sever the tether 110 into two separate pieces. Preferably, the pyrotechnic charge 122 is a material known by the trademark ITLX, a trademark of Explosive Technology, Inc.

Figure 11:
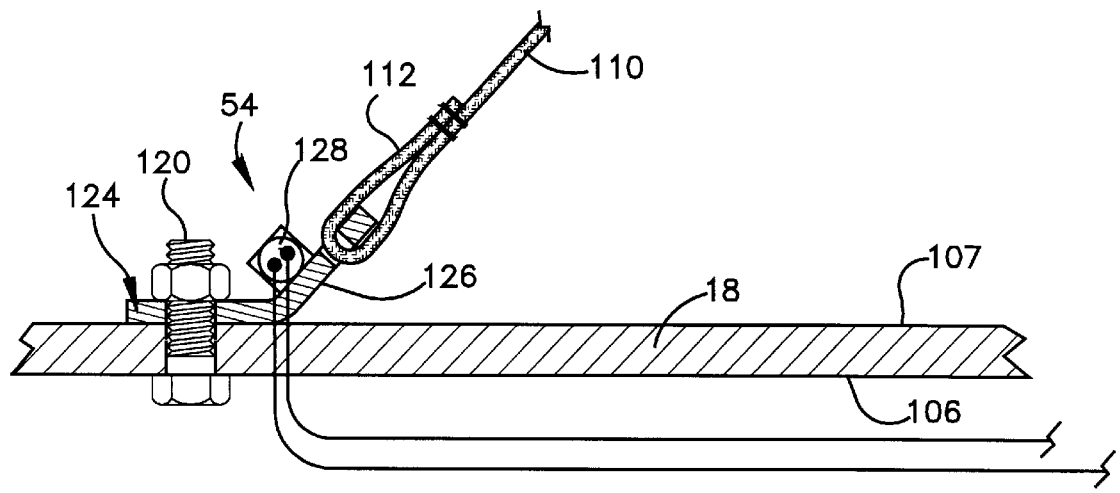
FIG. 11 illustrates a fourth embodiment of the release mechanism of the vehicle occupant protection apparatus of the present invention.

A fourth embodiment of the release mechanism 54 is illustrated in FIG. 11. The release mechanism 54 is a metal or plastic retainer 124 that is fixed to the reaction can 18 by a fastener 120. The first end 112 of the tether 110 is secured to a stem 126 of the retainer 124. A pyrotechnic charge 128 is located on the stem 126 of the retainer 124 between the reaction can 18 and the tether 110. Upon actuation, the pyrotechnic charge 128 severs the stem 126 of the retainer 124 releasing the tether 110.

From the above description of the invention, those skilled in the art will perceive improvements, changes and modifications. For example, multiple tethers may be connected to one release mechanism 54. Those skilled in the art will recognize that the inflatable device may be an air bag mounted in the vehicle steering wheel, an inflatable side curtain, an inflatable knee bolster, or any other inflatable device known in the art. Such improvements, changes and modifications within the skill of the art are intended to be covered by the appended claims.

Having described the invention, the following is claimed:

1. A vehicle occupant protection apparatus comprising:
   an inflatable device for helping to protect an occupant of a vehicle during a crash condition;
   a support structure securing a portion of the inflatable device;
   a plurality of tethers extending between the support structure and the inflatable device;
   at least one sensor for sensing a vehicle occupant condition and generating an occupant condition signal indicative of the sensed condition; and a control module for receiving the occupant condition signal and determining a preferred inflation volume and shape for the inflatable device;

the control module selectively determining whether one or more of the plurality of tethers is to be released for controlling the inflation of the inflatable device to the preferred inflation volume and shape and initiating the release of the one or more of the plurality of tethers from the support structure.

2. The vehicle occupant protection apparatus of claim 1 further being defined by:

each one of the plurality of tethers being secured to the support structure by a release mechanism;

the release mechanism being actuatable by the controller; and actuation of the release mechanism releasing one or more of the plurality of tethers from the support structure.

3. The vehicle occupant protection apparatus of claim 2 further being defined by:

the release mechanism including a solenoid mechanism connected to an anchoring plate;

in an unactuated condition, the solenoid mechanism pressing the anchoring plate against the support structure to clamp the plurality of tethers against the support structure;

upon actuation, the solenoid mechanism moving the anchoring plate away from the support structure to release the plurality of tethers.

4. The vehicle occupant protection apparatus of claim 2 further being defined by:

the release mechanism being an exploding fastener.

5. The vehicle occupant protection apparatus of claim 2 further being defined by:

each tether having a first end, a second end and an intermediate portion between the first and second ends;

the first end of the tether being secured to the support structure and the second end of the tether being secured to the inflatable device;

the intermediate portion of the tether being secured to the support structure by the release mechanism;

upon actuation of the release mechanism, the intermediate portion of the tether being released.

6. The vehicle occupant protection apparatus of claim 2 further being defined by:

the tether being secured to the support structure by a plurality of release mechanisms;

the plurality of release mechanisms being systematically actuated to control an amount of the tether being released.

7. The vehicle occupant protection apparatus of claim 2 further being defined by:

the release mechanism being a pyrotechnic charge that is applied to a portion of the tether;

the pyrotechnic charge being ignitable by the controller to sever the tether.

8. The vehicle occupant protection apparatus of claim 2 further being defined by:

the release mechanism including a retainer having a stem;

a pyrotechnic charge being applied to the stem of the retainer;

the retainer securing the tether to the support structure;

the pyrotechnic charge being ignitable by the controller to sever the stem of the retainer and release the tether.

9. The vehicle occupant protection apparatus of claim 1 further being defined by:

each of the tethers including a welt that surrounds a portion of the tether that is secured to the support structure.

10. A vehicle occupant protection apparatus comprising:

an inflatable device for helping to protect an occupant of a vehicle during a crash condition;

a support structure securing a portion of the inflatable device;

a plurality of tethers extending between the support structure and the inflatable device;

at least one sensor for sensing a vehicle occupant condition and generating an occupant condition signal indicative of the sensed condition; and a control module for receiving the occupant condition signal and determining a preferred inflation volume and shape for the inflatable device;

the control module determining which of the respective tethers to release for inflating the inflatable device to the preferred inflation volume and shape and initiating the release of the respective tethers from the support structure, each of the tethers being secured to the support structure by a release mechanism;

the release mechanism being actuatable by the controller; and actuation of the release mechanism releasing the tether from the support structure, the release mechanism being an exploding fastener, the exploding fastener including a tubular bolt;

the tubular bolt having a threaded outer surface for receiving a nut and a chamber having a pyrotechnic charge.

11. A vehicle occupant protection apparatus comprising:

an inflatable device for helping to protect an occupant of a vehicle during a crash condition;

a support structure securing a portion of the inflatable device;

a plurality of tethers extending between the support structure and the inflatable device;

at least one sensor for sensing a vehicle occupant condition and generating an occupant condition signal indicative of the sensed condition; and a control module for receiving the occupant condition signal and determining a preferred inflation volume and shape for the inflatable device;

the control module selectively determining whether at least one but less than all of the plurality of tethers is to be released for controlling inflation of the inflatable device to the preferred inflation volume and shape and initiating the release of the at least one but less than all of the plurality of tethers from the support structure.

* * * * *